June 28, 1960  A. Z. PANASEWICZ  2,942,362
CROSS BEAM ASSEMBLY
Filed Nov. 30, 1956

INVENTOR.
Anton Z. Panasewicz
BY
R. F. Barnard
ATTORNEY

United States Patent Office 2,942,362
Patented June 28, 1960

2,942,362
CROSS BEAM ASSEMBLY

Anton Z. Panasewicz, Parma, Ohio, assignor to General Motors Corporation, Detroit, Mich., a corporation of Delaware Filed Nov. 30, 1956, Ser. No. 625,515

4 Claims. (Cl. 37—144)

The present invention relates to a cross beam assembly for a crawler tractor unit comprising two relatively oscillating tractor halves, the cross beam supporting an upper sheave block assembly about which there is reeved a run of cable for vertically adjusting an earth-moving attachment carried by the tractor.

The present invention is directed to a cross beam assembly mounted between two halves of a crawler tractor which are connected together by a transversely extending pivot shaft for relative oscillatory movement. Such a twin unit type tractor is shown in the co-pending application of Russell C. Williams, S.N. 455,903, filed September 14, 1954. In such structures as are shown in the aforementioned application, the two complementary tractor halves, which are independently powered, may oscillate to each other as the twin power unit travels over the ground. This feature of relative oscillation between the tractor halves allows each tractor half to remain in driving engagement with the terrain although it be quite irregular. By way of contrast, if the tractor halves were not capable of relative oscillation, one or the other track of the vehicle may be lifted off the ground as the vehicle travels over terrain having a highly irregular contour.

A problem is presented by the fact that the two tractor halves are capable of relative oscillation when an earth-moving attachment such as a bulldozer blade is to be carried by the twin power unit. Where such an attachment is cable-operated from a power control unit normally positioned at or near the rear of a tractor, an upper sheave block is positioned forwardly of the tractor above the attachment and has various runs of cable reeved therethrough for vertically adjusting the attachment through operation of the power control unit. The upper sheave block is supported by a cross beam mounted at the forward end of the tractor unit. Therefore, as the tractor halves oscillate relative to each other, the cross beam and the sheave block mounted thereon must be able to accommodate such movement. Moreover, the movement of the sheave block and cross beam must be controlled within limits so as not to disrupt operation of the cable unit in vertically adjusting the earth-handling attachment.

A principal feature of this invention, therefore, is the provision of a cross beam for a twin unit tractor of the type described which is interconnected between the tractor halves of such a unit as to accommodate relative oscillatory movement therebetween.

Within the scope of this invention, a cross beam of the type described has one end pivotally connected to one tractor half for rotation thereabout while the other half is slidably seated in a socket in the other tractor half for reciprocal movement relative to such socket.

Because the two tractor halves oscillate about a common pivot shaft, the points of connection of the cross beam to the two halves swing in arcs relative to the pivot shaft. Thus, it may be seen that these connections move in arcuate paths toward and away from each other. Therefore, it is another feature of this invention to so mount the cross beam between the tractor halves as to permit the cross beam to rotate in more than one plane.

These and other features of this invention will appear more fully hereinafter as the description of the invention proceeds, reference being made therein to the accompanying drawings in which.

Figure 1:
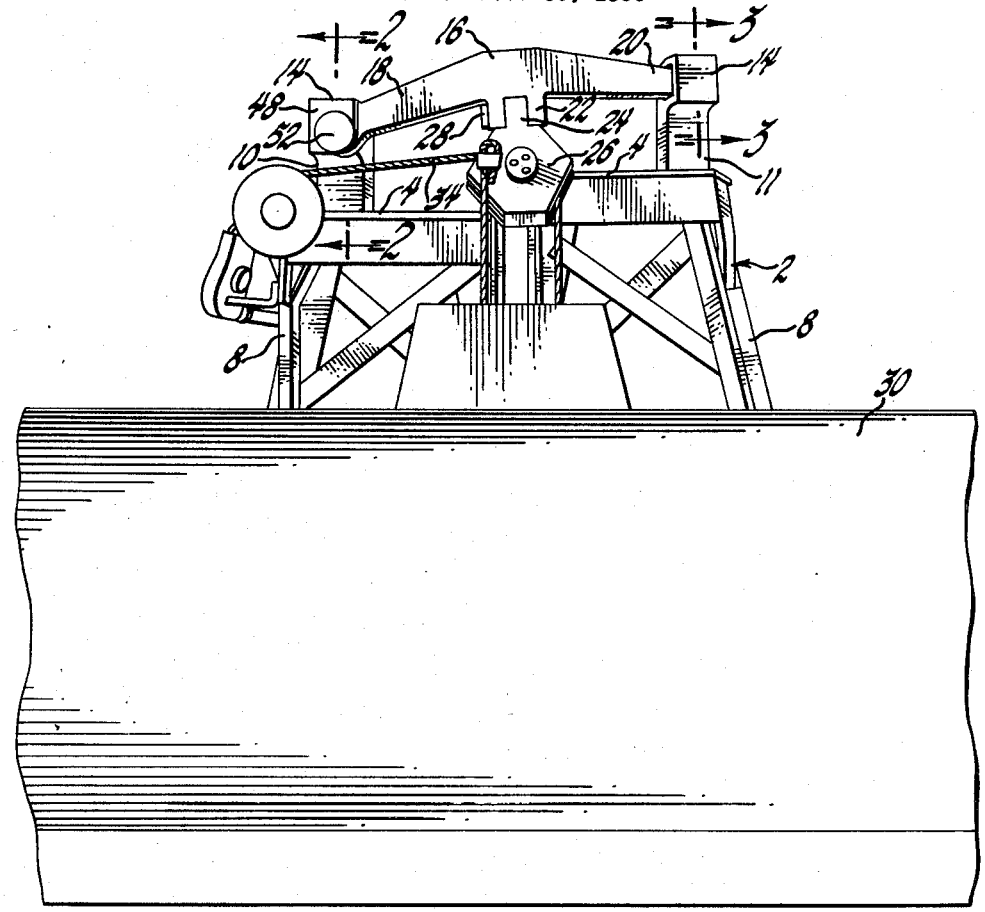
Figure 1 is a front elevation of a twin unit tractor having a cable-operated material handling blade and the cross beam of this invention for mounting the upper sheave block of the blade controlling cable system.
Figure 2:
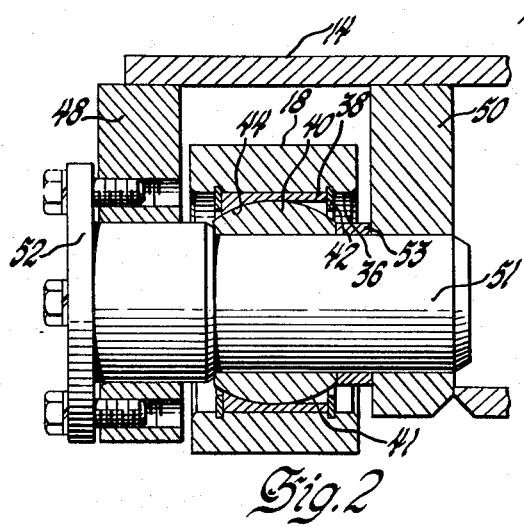
Figure 2 is a cross section taken on line 2—2 of Figure 1.
Figure 3:
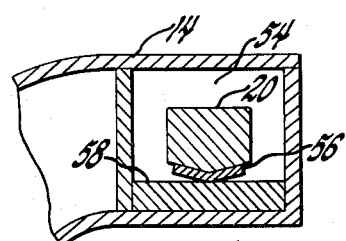
Fig. 3 is a cross section taken on line 3—3 of Figure 1.

Referring now to the drawings, there is shown a twin-powered crawler tractor unit 2 comprising two complementary tractor halves 4 connected together near their rear ends by a pivot shaft about which the tractor halves may oscillate relative to each other as disclosed in the aforementioned copending application. At the forward end of each tractor half, there are front guard structures 8 enclosing the independent power units. Upstanding from each guard structure is a support or pillar 10 and 11 each having a forwardly extending portion 14.

A cross beam 16 is adapted for connection at either of its ends 18 and 29 to the pillars 10 and 11 and has intermediate of its length substantially at the mid-point between the two tractor halves a pair of laterally spaced depending bosses 22 between which there projects an ear 24 of the upper sheave block 26. It will be understood that the sheave block is pivotally connected between the bosses 22 by suitable means such as a pivot pin 28.

A bulldozer blade 30 extending transversely across the front of the vehicle has two push beams (not shown) pivotally connected at their rear ends to the respective tractor halves for pivotal movement in the usual manner. Cable 34 extends forwardly from the usual power control unit at the rear of the vehicle and is reeved about the upper sheave block 26 and a suitable attachment (not shown) carried by the rear face of the bulldozer blade. Thus, it will be apparent that the operator, through operation of the power control unit, may vertically adjust the cable operated dozer blade relative to the vehicle.

The end 18 of the cross beam has a bore 36 extending longitudinally therethrough and in which there is seated an annular wear ring or plate 38 in which an annular bushing 40 is received. Snap rings 42 are seated in suitable annular grooves in the bore 36 to retain the wear plate 38 in place. The bushing 40 has an arcuate or spherical outer surface 41 which cooperates with a similar surface 44 on the wear ring for limited relative swivelling or universal movement between longitudinally spaced depending walls 48 and 50 of the pillar 10. A pivot pin 51 is mounted between the longitudinally spaced depending walls 48 and 50 of the forwardly extending portion 14 of the pillar 10 and extends through a bore in the bushing 40, a plate 52 formed integral with the pin 51 locking the latter in place as by bolting to the forward wall 48 of the pillar support. The usual shims 53 may be used to position the bushing 40 on the pin 51. Thus, it may be seen that the cross beam is pivotally supported within the pillar 10 by a pivotal connection which will permit the cross beam to rotate not only in a plane normal to the axis of the pivot pin, but also in other planes within limits imposed by the mounting between the walls 48 and 50 of pillar portion 14.

The other pillar 11 has a socket 54 therein of desired size and in which there is loosely slidably seated the other end 20 of the cross beam. A chevron-shaped wear plate 56 may then be welded to the end 20 of the cross beam for bearing and sliding movement on a bearing surface 58 within the socket 11.

It may be seen that while the two tractor halves oscillate, the cross beam may pivot at one end 18 in a plane about the pin 51 and may slide at the other end 20 within the socket. Moreover, the cooperation between the spherical surfaces 41 and 44 respectively of the bushing and wear plate permit pivotal movement of the cross beam in planes other than one normal to the pivot pin 51 but within limits imposed by the mounting aforementioned. Thus, the forward portions 14 of the pillars swing through arcs relative to each other, the cross beam may follow this movement by rotating in more than one plane.

I claim:

1. In combination with a track-laying vehicle of the type comprising, two tractor halves pivotally interconnected for relative oscillatory movement and having a cable-operated material handling attachment, a means for supporting a cable block for said attachment on said vehicle; said means comprising an integral cross beam interconnecting said tractor halves, an internal spherical bushing in one end of said beam, a longitudinally extending pin pivotally securing said bushing and beam end to one tractor half, said beam being capable of pivotal movement about said bushing, the other end of said beam being longitudinally and laterally slidably mounted on the other tractor half.

2. In combination with a track-laying vehicle of the type comprising, two tractor halves pivotally interconnected for relative oscillatory movement and having a cable-operated material handling attachment, a means for supporting a cable block for said attachment on said vehicle; said means comprising an integral cross beam interconnecting said tractor halves, a universal joint connection between one end of said beam and one tractor half and including relatively pivotal ball and socket members, one of said members being fixedly located on said one beam end and the other of said members being fixedly located on said one tractor half, the other end of said beam being longitudinally and laterally slidably mounted on the other tractor half, whereby said cross beam may oscillate in more than one plane.

3. In combination, a track-laying vehicle of the type comprising two tractor halves pivotally interconnected for relative oscillatory movement and having a cable-operated material handling attachment, laterally spaced supports carried respectively by said tractor halves, an integral cross beam interconnecting said supports and mounting a cable block for said attachment, one end of said beam having an universal joint connection to one support, said connection including a wear ring including a spherical bearing surface disposed internally of said one beam end, a bored spherical bushing angularly slidably disposed within said ring, and a longitudinally extending pivot pin extending through said one support and bushing, the other support having a longitudinally extending socket opening laterally toward said one support, the other end of said beam being loosely slidably disposed within said socket for movement longitudinally and laterally of the latter.

4. In combination with a track laying vehicle of the type comprising two tractor halves pivotally interconnected for relative oscillatory movement and having a cable-operated material handling attachment, means for supporting a cable block for said attachment on said vehicle; said means comprising an integral cross beam interconnecting said tractor halves, a universal joint connection between one end of said beam and one tractor half and including relatively pivotal ball and socket members, one of said members being fixedly located on said one beam end and the other member being fixedly located on said one tractor half, a socket on the other tractor half opening laterally toward said universal joint connection, and the other end of said beam being loosely slidably disposed within said socket for movement longitudinally and laterally of the latter.

References Cited in the file of this patent

UNITED STATES PATENTS

| | | |
|---|---|---|
| Re. 24,175 | Peterson | July 3, 1956 |
| 1,675,013 | Young | June 26, 1928 |
| 2,182,412 | Stewart | Dec. 5, 1939 |
| 2,215,025 | Austin | Sept. 17, 1940 |